UNITED STATES PATENT OFFICE.

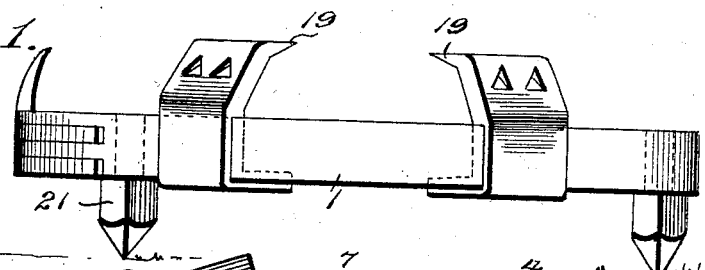
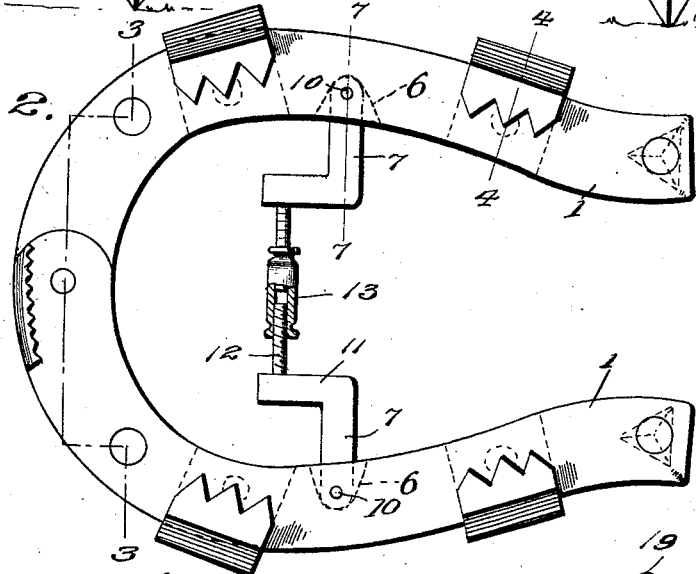
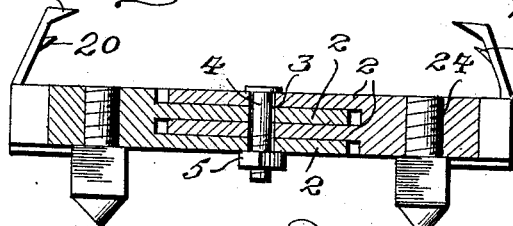
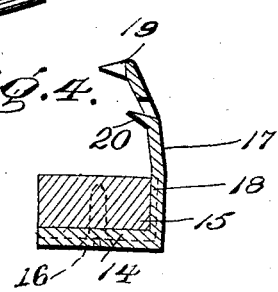
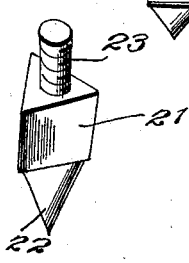

WLADISLAUS RAKOWSKI, OF PALMERTON, PENNSYLVANIA, AND JOHN GLOWACKI, OF DAVIS, WEST VIRGINIA.

HORSESHOE.

1,074,202. Specification of Letters Patent. Patented Sept. 30, 1913.

Application filed October 18, 1912. Serial No. 726,552.

*To all whom it may concern:*

Be it known that we, WLADISLAUS RAKOWSKI and JOHN GLOWACKI, subjects of the Emperor of Germany and the Emperor of Austria-Hungary, respectively, residing at 353 Lehigh avenue, Palmerton, Pennsylvania, and Davis, in the county of Tucker and State of West Virginia, respectively, have invented certain new and useful Improvements in Horseshoes, of which the following is a specification.

This invention relates to horse shoes and has as its primary aim to provide a horse shoe which may be readily applied to and removed from the hoof and which may be readily adjusted to hoofs of various sizes.

It is a further aim of the invention to provide a horse shoe which may be readily and securely applied to the hoof without the use of nails or other securing devices which require to be driven into the hoof.

The horse shoe embodying the present invention is of that type including a pair of pivoted sections which are adapted to be drawn together or spread apart in order to adjust the shoe to the hoof, and it is a further aim of the invention to so pivot the sections that they will not be weakened at their point of connection and that the pivot will be to a certain extent relieved of strain.

Further the invention aims to provide a shoe of the type mentioned, all parts of which may be replaced when they become worn or broken.

For a full understanding of the invention reference is to be had to the following description and accompanying drawing, in which:—

Figure 1 is a view in side elevation of the horse shoe constructed in accordance with the present invention. Fig. 2 is a top plan view thereof. Fig. 3 is a sectional view on the line 3—3 of Fig. 2. Fig. 4 is a vertical transverse sectional view on the line 4—4 of Fig. 2. Fig. 5 is a perspective view of one of the adjusting arms of the shoe. Fig. 6 is a similar view illustrating one of the calks. Fig. 7 is a sectional view on the line 7—7 of Fig. 2.

Corresponding and like parts are referred to in the following description and indicated in all the views of the accompanying drawing by the same reference characters.

In the drawing the shoe is illustrated as consisting essentially of a pair of pivotally connected sections, each of which is indicated by the numeral 1. Each of the sections 1 is substantially of the same form as one-half of an ordinary horse shoe, and the sections at their forward ends are each bifurcated to form a pair of spaced ears 2, the ears of one section being interdigitated with those of the other section in the manner shown in Fig. 3 of the drawings. The ears 2 are formed with registering openings 3 through which is fitted a pivot-bolt 4, the head of which bears against the uppermost one of the ears and is located next to the hoof while the nut 5 upon the bolt bears against the under side of the lowermost one of the said ears. At this point it will be understood that by forming each of the sections with a pair of ears and interdigitating the ears in two sections, a much more substantial joint is provided between the sections than would be the case if each section was provided with but a single ear, as is usually the case. It will also be understood that the pivot bolt 4 is by reason of this construction subjected to less strain than would otherwise be the case. In order that the sections may be separated or drawn together so as to adapt the shoe for application to hoofs of various sizes, an adjusting means is provided which will now be described.

The sections 1 at corresponding points at their inner edges are formed with recesses 6 and fitted at one of its ends in each of the recesses is an adjusting arm 7, the arm being formed with an opening 8 which is in registration with openings 9 formed in vertical alinement in the upper and lower walls of the recess. A pivot screw 10 is fitted through the said registering openings in the adjusting arm and the section 1 into which its said end is fitted, the threaded end of each screw fitting in the opening 9 in the upper wall of the recess in the respective section 1 and the lower or headed end of the screw being countersunk as shown in Fig. 4. The inner or adjacent ends of the arms 7 are formed with forwardly projecting integral portions 11 provided with laterally projecting threaded stems 12. The stems 12 fit within the opposite ends of a sleeve-nut 13 and, being oppositely threaded, rotation of the sleeve-nut in one direction or the other will serve to adjust the arms, toward or away from each other and thereby swing the sections 1 upon their pivot 4. There is a decided advantage in having the threaded stems 12 offset with relation to or out of alinement with the arms 7. In horse shoes of this type, it is customary to pivotally connect with each of the sections of the shoe, a threaded stem and to connect these stems by means of a sleeve-nut rotatable to adjust the shoe sections, the stems being in axial alinement with each other.

In our construction the arms 7 are angular and have the forwardly offset threaded stems 12 so as to dispose the arms 7 and the threaded stems in advance of instead of beneath the frog of the hoof, thus avoiding injury to the frog, which might occur if the stems 12 were located directly in alinement with the basal portions of the arms 7.

In order that the shoe may be held firmly to the hoof when the sleeve-nut 13 is rotated to draw the sections of the shoe together, each of the sections of the shoe is provided with one or more gripping tongues. Each of these tongues includes an attaching portion 14 which is seated in a countersink 15 in the under side of the respective shoe section and is secured in place by means of screw 16. Projecting upwardly substantially at right angles from the portion 14, is a gripping portion 17, the lower part of which fits in a recess 18 formed in the outer edge of the respective section 1. Above the plane of the upper face of the said section, each of the gripping tongues is inclined inwardly to a slight degree, as clearly shown in Figs. 1, 3 and 4 of the drawing. The upper edge of each of the gripping portions 17 is bent to project inwardly in approximately a horizontal plane and is formed with teeth 19 designed to bite into the hoof to which the shoe is applied. It is preferable that the portion 17 of each of the gripping tongues be stamped with teeth 20 which are located below the teeth 19 and are also designed to bite into the hoof. As shown in Fig. 2 of the drawing each of the sections 1 is provided with a pair of gripping tongues and one of these tongues is located forwardly of, and the other rearwardly of the pivot 10 on the respective section. It will be understood, however, that a greater or less number of the tongues might be provided upon each of the sections, if desired. However, by providing a pair of the gripping tongues upon each section and arranging them in the manner stated, the strain upon the gripping and adjusting elements of the shoe is equalized.

A set of calks is provided for each of the two sections, and each of these calks consists of a body 21 which is preferably triangular in cross-section and at its lower end portion is substantially pyramidal in form and sharply pointed as indicated at 22. The body 21 of each calk is formed at its upper end with a threaded stud 23 and these studs are fitted into openings 24 located one adjacent the forward and the other adjacent the rear end of each of the sections 1.

From the foregoing description of the invention, it will be seen that there is provided a horse shoe of the type mentioned, all of the elements of which may be disconnected one from the other and that the shoe may be readily and quickly adjusted to a hoof of any size within reasonable limits.

It will be seen that by pivoting the arm 7 in the recesses 6, the stems 12 are always kept in alinement, whether the sections 1 of the shoe be spread apart or down together.

What we claim is:—

In a horse shoe, sections connected for adjustment with relation to each other, an arm pivoted to each section and having a forwardly offset threaded stem, and a nut threaded upon the stems of the arms.

In testimony whereof we affix our signatures in presence of two witnesses.

WLADISLAUS RAKOWSKI. [L. S.]
JOHN GLOWACKI. [L. S.]

Witnesses:
EUGENE F. BROSNIHAN,
B. GONGOLA.